(No Model.)
M. WUERPEL.
BALANCED VALVE.
No. 397,825. Patented Feb. 12, 1889.
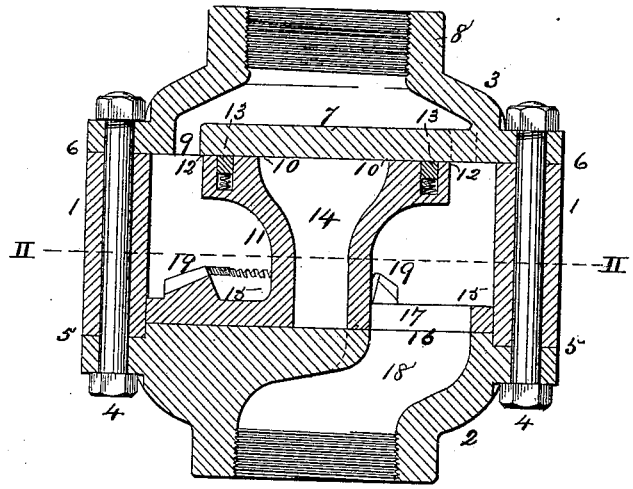
Fig. I.
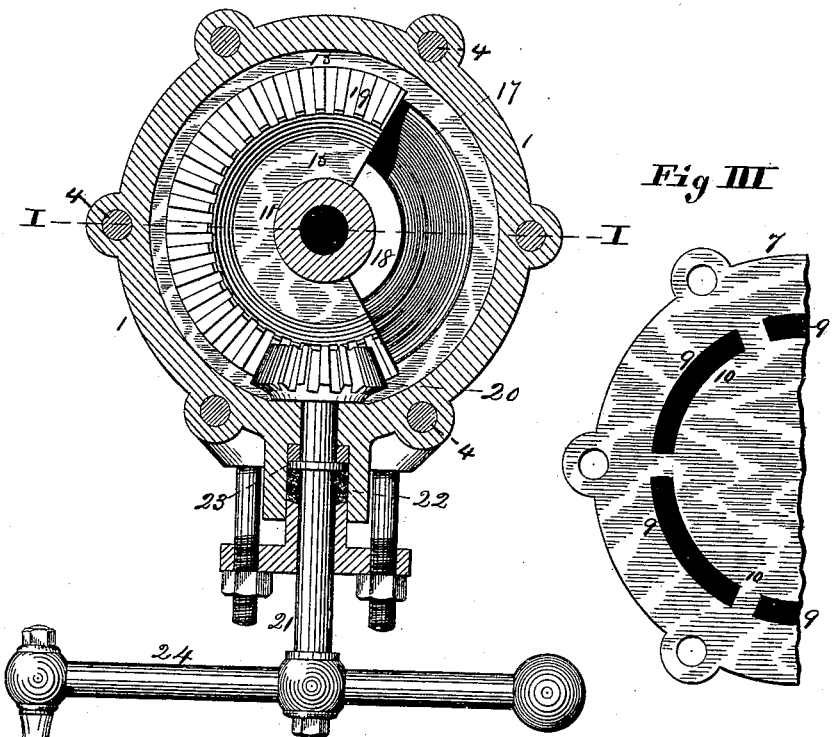
Fig. II.
Fig. III.
Attest:
E. Arthur
Frank L. Rice
Inventor:
Morris Wuerpel.
By Knight Bros.
Attys.

UNITED STATES PATENT OFFICE.

MORRIS WUERPEL, OF ST. LOUIS, MISSOURI.

BALANCED VALVE.

SPECIFICATION forming part of Letters Patent No. 397,825, dated February 12, 1889.

Application filed April 30, 1888. Serial No. 272,352. (No model.)

*To all whom it may concern:*

Be it known that I, MORRIS WUERPEL, of the city of St. Louis, in the State of Missouri, have invented a certain new and useful Improvement in Balanced Valves, of which the following is a full, clear, and exact description, reference being had to the accompanying drawings, forming part of this specification.

This is shown as a hand-valve; but it may be actuated by an engine-governor or other machinery.

Figure I is a section at I I, Fig. II. Fig. II is a section at II II, Fig. I. Fig. III is an inside view of part of the cap.

The valve-case has a cylindrical part or body, 1, to which is fitted the seat-piece 2. 3 is the cap fitted to the other end of the body. These parts are held together by bolts 4. They may be fitted together with ground-joints at 5 and 6, or the joints may be made tight with gaskets. The cap has a flat plate, 7, whose rim fits the end of the barrel, and a neck, 8, into which a pipe may be screwed. The plate 7 has a number of curved apertures or ports, 9, within which is the bearing 10 for the head or upper annular face, 12, of the valve proper, 11. This face has packing-ring 13 pressed against the face 10 by springs beneath it, so as to exclude the fluid passing through the valve from the interior 14 of the valve 11. The interior cavity, 14, of the valve has no special purpose, except lightening the weight of the valve. The lower part of the valve has a flat disk, 15, with a ground-bearing on the seat 16 of the piece 2. This disk has a port or aperture, 17, which, when the valve is in the position shown, is in line with the port or passage 18, extending through the piece 2. The disk 15 has upon it a bevel cog-segment, 19, engaged by a bevel-wheel, 20, upon a shaft, 21. The shaft 21 passes through a stuffing-box, 22, within which it has a collar, 23, preventing the endwise movement of the shaft.

At 24 is shown a hand-crank, by which the shaft is turned.

It will be seen that by turning the valve one-half around the parts 17 and 18 are closed, as they only extend about one-third around the disk 14 and seat 15, and are then out of line with each other.

This form of valve is specially applicable where it is needed that the valve shall be easily adjusted as to the area of the passage, for, being balanced, it is easily turned, and the hand-shaft and cog-connection give ready means for turning the valve a very little distance.

I claim—

1. The combination of the valve 11, having a disk, 15, working upon the seat 16, and having a port, 17, adapted to be brought in line with the port 18 of the seat-piece, and having a head, 12, with packing-ring bearing against the plate 7, which has apertures 9 outside the line of bearing, substantially as and for the purpose set forth.

2. The valve 11, having bearing upon its seat 16, and an expanding head, 12, with ring-packing against the plate, a cog-sector, 19, upon the valve, a cog-wheel, 20, engaging the cog-sector, and a hand-shaft carrying the cog-wheel and passing through a stuffing-box, 22, as set forth.

MORRIS WUERPEL.

In presence of—
SAML. KNIGHT,
JOS. WAHLE.